United States Patent
Monajemi et al.

(10) Patent No.: US 9,869,387 B2
(45) Date of Patent: Jan. 16, 2018

(54) PREDICTIVE CONTROL OF A CHANGE-OF-MIND-SHIFT MANEUVER

(71) Applicant: GM GLOBAL TECHNOLOGY OPERATIONS LLC, Detroit, MI (US)

(72) Inventors: Dara Monajemi, Lansing, MI (US); Brian H Fiore, Waterford, MI (US); Jeremy V Horgan, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 371 days.

(21) Appl. No.: 14/818,917

(22) Filed: Aug. 5, 2015

(65) Prior Publication Data

US 2017/0037957 A1    Feb. 9, 2017

(51) Int. Cl.
| | |
|---|---|
| *F16H 61/06* | (2006.01) |
| *F16H 59/02* | (2006.01) |
| *F16H 61/00* | (2006.01) |
| *F16H 59/24* | (2006.01) |

(52) U.S. Cl.
CPC ....... *F16H 61/061* (2013.01); *F16H 59/0204* (2013.01); *F16H 59/24* (2013.01); *F16H 2059/0239* (2013.01); *F16H 2061/0093* (2013.01); *F16H 2306/24* (2013.01)

(58) Field of Classification Search
None
See application file for complete search history.

(56) References Cited

U.S. PATENT DOCUMENTS

| | | | |
|---|---|---|---|
| 8,323,150 B2 | 12/2012 | Atmaram et al. | |
| 8,944,957 B2 | 2/2015 | Atmaram et al. | |
| 8,977,457 B2 | 3/2015 | Robinette et al. | |
| 9,249,881 B1* | 2/2016 | Monajemi | F16H 61/04 |
| 9,316,309 B2* | 4/2016 | Atmaram | F16H 61/0437 |

* cited by examiner

*Primary Examiner* — Jacob S Scott
(74) *Attorney, Agent, or Firm* — Quinn IP Law

(57) ABSTRACT

A system includes a torque converter having a turbine, a transmission having friction clutches and an input member connected to the turbine, and a controller. The controller is programmed to control a change-of-mind shift maneuver of the transmission. By executing a method, the controller detects the change-of-mind shift maneuver, predicts an acceleration profile of the turbine for a next-requested shift of the detected shift maneuver as a function of a calibrated desired shift time and an output speed of the transmission, calculates a shift control value for a next-requested shift of the shift maneuver using the predicted acceleration profile, and executes the next-requested shift via the clutches using the calculated shift control value. The shift maneuver may be a skip-at-sync quick shift-to-quick shift or power downshift-to-power downshift. The shift value may be a clutch pressure for an offgoing holding clutch or a torque management level from an engine.

14 Claims, 3 Drawing Sheets

PREDICTIVE CONTROL OF A CHANGE-OF-MIND-SHIFT MANEUVER

TECHNICAL FIELD

The present disclosure relates to the predictive control of a change-of-mind shift maneuver.

BACKGROUND

An automatic transmission typically includes a set of friction clutches that are engaged to couple rotatable input and output members of the transmission. Engagement of the friction clutches in different combinations connects ring gear, sun gear, and carrier members of one or more planetary gear sets together and/or to a stationary member to achieve a desired transmission output speed ratio. A clutch-to-clutch shift from one transmission output speed ratio to another is performed automatically in response to commands from a controller. A clutch associated with the current speed ratio, i.e., an offgoing clutch, is released while a clutch associated with a desired new speed ratio is applied, with the newly applied clutch referred to as an oncoming clutch. The term "change-of-mind shift" as it is used with respect to clutch-to-clutch shifts generally describes a requested shift to a gear state, e.g., via an action of a driver using shift paddles, which initiates before completion of a prior-requested shift event.

SUMMARY

A vehicle is disclosed herein that includes an internal combustion engine, a torque converter assembly having a turbine, a transmission driven by the turbine and having friction clutches, and a controller. The controller is configured, i.e., equipped in hardware and programmed in software, to automatically control the friction clutches of the transmission during a clutch-to-clutch shift of the type described above. The controller is further programmed with predictive control logic suitable for improving the performance of change-of-mind shift maneuvers, which as noted above include any requested shift to another gear state that initiates before the completion of a prior-requested shift event, i.e., a "skip-at-sync" maneuver. Two example skip-at-sync change-of-mind shifts illustrated herein are an oncoming clutch-controlled quick shift-to-quick shift" maneuver through neutral and a power downshift-to-power downshift maneuver, with a primary difference being that the skip-at-sync quick shift-to-quick shift maneuver occurs while the vehicle is coasting and thus with zero throttle while the skip-at-sync power downshift-to-power downshift maneuver occurs in conjunction with positive throttle request. Moreover, the skip-at-sync quick shift-to-quick shift maneuver involves a dual torque controlled shift strategy that merges torque control of the first shift with that of the subsequent second shift in the particular manner set forth herein.

The controller includes a torque request module embodied as a specific hardware/software block of the controller. The torque request module is operable for requesting a level of torque management from the engine or other prime mover. A profile prediction module, likewise a corresponding hardware/software block of the controller, is operable for predicting an acceleration profile of the turbine for a next-requested shift during the change-of-mind shift scenario noted above, doing so as a function of a calibrated desired shift time and transmission output speed.

For instance, for a prior-requested 6-5 power downshift a driver may tap a shift paddle once to request a shift from $6^{th}$ gear to $5^{th}$ gear. Before the requested shift to 5th gear is complete, however, the driver may tap the shift paddle a second time to request a shift to $4^{th}$ gear, with $4^{th}$ gear in this particular example being the next-requested shift. Depending on the shift maneuver, the controller calculates a shift control value and executes the next-requested shift using the calculated shift control value.

The shift control value for the skip-at-sync quick shift-to-quick shift maneuver is the level of managed torque from the engine, which provides the transmission input torque when transmitted across the torque converter. For the example skip-at-sync power downshift-to-power downshift maneuver, however, the shift control value is a predicted clutch torque for an offgoing clutch for the next-requested shift. In the latter example, a lumped inertia model of powertrain components may be used to calculate the shift control value. The clutch pressure can then be staged for the offgoing clutch at close to return spring pressure so as to reduce shift delay and noise when executing the next-requested shift.

In particular, a powertrain is disclosed that includes a torque converter having a turbine, a transmission having friction clutches and an input member connected to the turbine, and a controller. The controller has a processor and memory on which is recorded instructions for controlling a change-of-mind shift maneuver of the transmission from a first-requested shift to a next-requested shift, i.e., in a clutch-to-clutch shift involving at least some of the friction clutches. The controller is configured to detect the change-of-mind shift maneuver, predict an acceleration profile of the turbine for the next-requested shift as a function of a calibrated desired shift time for the change-of-mind shift maneuver and an output speed of the transmission, calculate a shift control value for the next-requested shift using the predicted acceleration profile, and command execution of the next-requested shift using the calculated shift control value.

A method is also disclosed for controlling a change-of-mind shift maneuver of powertrain that includes a torque converter having a turbine, and a transmission having a plurality of friction clutches and an input member connected to the turbine. The change-of-mind shift maneuver includes a first-requested shift and a next-requested shift. The method includes receiving, via the controller, a set of vehicle or powertrain parameters, and detecting the change-of-mind shift maneuver via the controller using the set of parameters. The method further includes predicting an acceleration profile of the turbine for the next-requested shift as a function of a calibrated desired shift time and an output speed of the transmission, as well as calculating a shift control value for the next-requested shift using the predicted acceleration profile. The method further includes commanding the calculated shift control value, via the controller, to thereby complete the next-requested shift.

The above features and other features and advantages of the present disclosure are readily apparent from the following detailed description of the best modes for carrying out the disclosure when taken in connection with the accompanying drawings.

DETAILED DESCRIPTION

Figure 1:
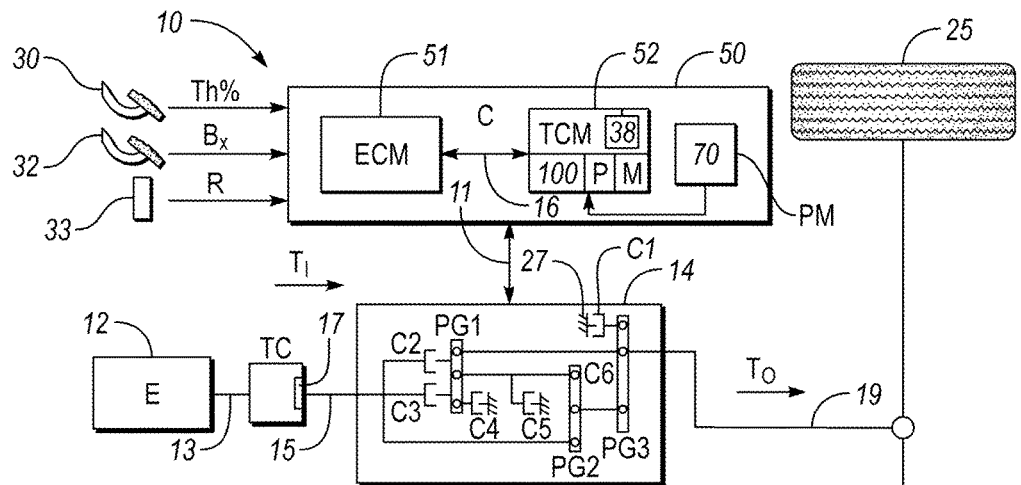
FIG. 1 is a schematic illustration of an example vehicle having a transmission and a controller programmed to control a change-of-mind shift of the transmission as set forth herein.
Figure 3:
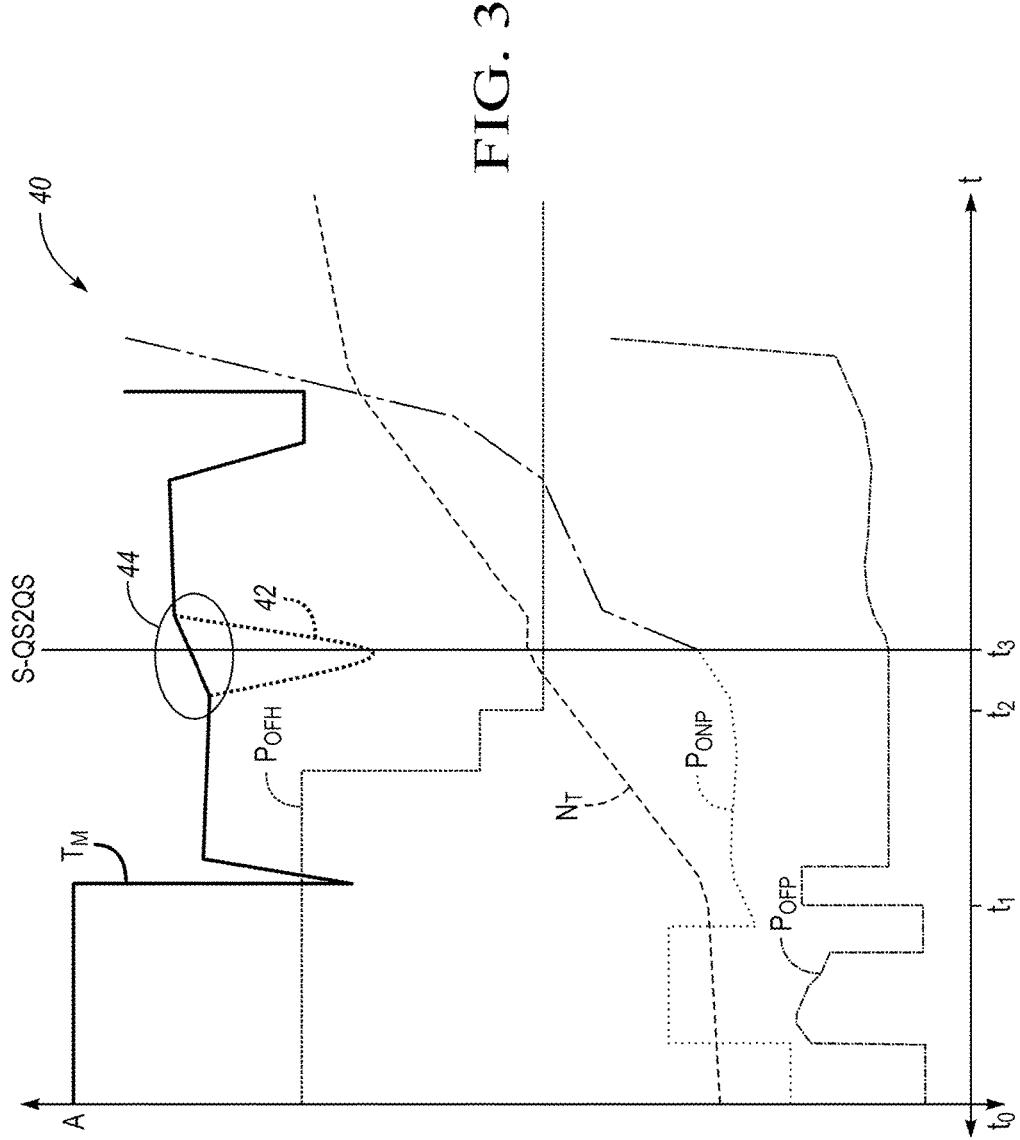
FIG. 3 is a time plot of parameters used by the controller of FIG. 1 in controlling an example skip-at-sync quick shift-to-quick shift change-of-mind shift maneuver.

Referring to the drawings, wherein like reference numbers correspond to like or similar components throughout the several figures, and beginning with FIG. 1, an example vehicle 10 includes a controller (C) 50. The controller 50 is configured, via the necessary hardware and associated software programming needed to implement a method 100 as shown in FIG. 3, to control a change-of-mind shift maneuver of the types described above. The controller 50 may include an engine control module (ECM) 51 and a transmission control module (TCM) 52 in communication with each other, e.g., over a controller area network (CAN) bus 16 as shown, with the TCM 52 being, in the non-limiting example of FIG. 1, the particular control module of the controller 50 that is programmed to execute the method 100. As is known in the art, the ECM 51 and TCM 52 may be separate hardware/software devices in spite of the simplified depiction as part of a unitary controller 50 in FIG. 1.

The vehicle 10 may include a prime mover such as an internal combustion engine (E) 12. The engine 12 is coupled to a transmission (T) 14, for instance via hydrodynamic torque converter (TC) having a turbine 17. The engine 12 may deliver input torque (arrow $T_I$) to the torque converter (TC) via a crankshaft 13. The turbine 17 is directly connected to an input member 15 of the transmission 14. The transmission 14 also includes an output shaft 19 that ultimately conveys output torque (arrow $T_O$) to a set of drive wheels 25.

Within the transmission 14, multiple gear sets such as three example gear sets PG1, PG2, and PG3 are selectively engaged via a set of friction clutches, for instance five friction clutches C1, C2, C3, C4, C5, via electro-hydraulic controls (not shown). The friction clutches C1-C5 are applied via fluid (not shown) that is circulated under pressure from a fluid pump and flow control valves (not shown) so as to connect nodes/members of the various gear sets PG1, PG2, PG3 together or to a stationary member 27 of the transmission 14. As is known in the art, the term "nodes" may encompass sun, ring, and carrier gear elements in a typical planetary gear configuration. The transmission 14 of FIG. 1 may be a multi-speed transmission, for instance an 8-speed transmission, although the transmission 14 is not limited to such an embodiment. For instance, a dual-clutch transmission or DCT may be used within the intended inventive scope.

Figure 2:
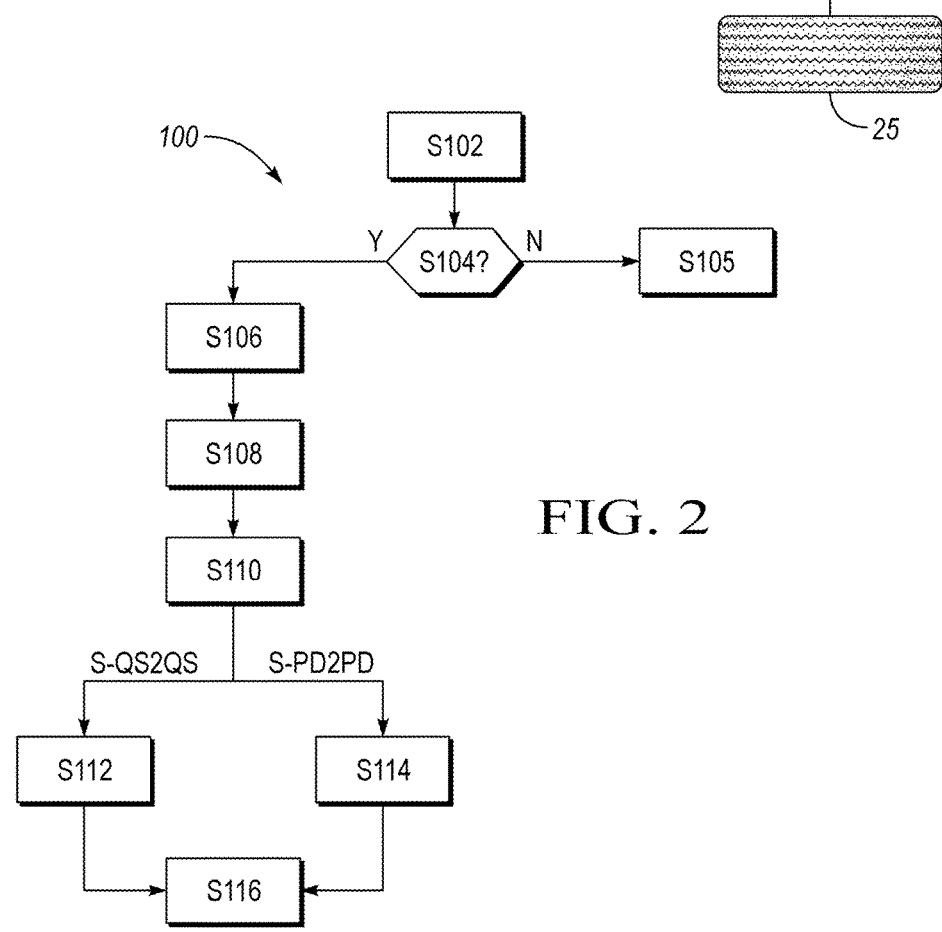
FIG. 2 is a flow chart describing example control logic for controlling a change-of-mind shift of the transmission.

The controller 50 of FIG. 1 selectively executes control logic embodying the method 100, an example of which is shown in FIG. 2 during a change-of-mind shift maneuver of the vehicle 10. Such logic may be pre-recorded as computer-readable instructions on tangible, non-transitory memory (M) and executed via a processor (P). Inputs to the controller 50 may include a throttle level (arrow Th %) from a throttle input device 30 such as an accelerator pedal, a braking level (arrow Bx) from a brake pedal 32, and a shift request (arrow R) from a shift request device 33, e.g., a shift paddle.

The controller 50 may be be configured as a computing device having such common elements as the processor (P) and memory (M), the latter including tangible, non-transitory memory devices or media such as read only memory, random access memory, optical memory, flash memory, electrically-programmable read-only memory, and the like. A torque request module (TRM) 38, which may be embodied as a specific hardware/software block of the TCM 52 within the controller 50, is operable for requesting a desired level of torque management from the engine 12. A prediction module (PM) 70 may be included within the overall structure and software of the controller 50. The controller 50 may also include any required logic circuitry including but not limited to proportional-integral-derivative (PID) control logic, a high-speed clock, analog-to-digital (A/D) circuitry, digital-to-analog (D/A) circuitry, a digital signal processor or DSP, and the necessary input/output (I/O) devices and other signal conditioning and/or buffer circuitry.

The controller 50 is programmed, among other possible functions, to execute the change-of-mind shift maneuver control methodology as disclosed herein, and to control the transmission 14 of FIG. 1 according to the methodology via a set of control signals (double-headed arrow 11). Thus, any shift control commands transmitted to the transmission 14 in the course of executing the method 100, such as a managed torque level from the engine 12 or a staged clutch pressure for an offgoing clutch in different example embodiments as described below in FIGS. 3 and 4, respectively, may be transmitted as part of the set of control signals indicated by double-headed arrow 11.

Referring to FIG. 2, the control logic noted above may be programmed into memory (M) of the controller 50 so as to provide the desired functionality. Beginning with step S102 of the method 100, the controller 50 of FIG. 1 monitors a set of vehicle or powertrain parameters as part of its overall shift control role. The set of parameters may include the present fixed gear state, e.g., $8^{th}$ gear, $7^{th}$ gear, $6^{th}$ gear, etc., as well as the transmission input speed and output speed, the throttle level (Th %) corresponding to a driver's torque request, braking levels (arrow Bx), and shift requests (arrow R). The method 100 proceeds to step S104 as these values are being monitored.

At step S104 the controller 50 next determines whether the set of parameters monitored at ongoing step S102 are indicative of a predetermined change-of-mind shift maneuver. While various approaches may be used for accomplishing this step, in a simplified approach the controller 50 may monitor the present gear state relative to the gear state of a first requested shift, and then determine whether a next-requested shift is detected before the completion of the first-requested shift. That is, the controller 50 is aware of whether a given clutch of the transmission 14 is in a torque phase or an inertia phase of a clutch-to-clutch shift, via the TCM 52, and thus whether a first-requested shift, such as from $6^{th}$ to $5^{th}$ gear, has completed or not at the time a next-requested shift, e.g., to $4^{th}$ gear, is detected. The presence of zero throttle or a positive throttle also allows the controller to recognize at step S104 which particular change-of-mind shift maneuver is to be controlled. The determination of a detected change-of-mind shift may be recorded in memory (M), e.g., as a bit flag. The method 100 proceeds to step S105 if a change-of-mind shift is not detected at step S104. Otherwise, the method 100 proceeds to step S106.

At step S105, with a change-of-mind shift not previously detected at step S104, the controller 50 does not access the prediction module 70 shown in FIG. 1. Instead, the controller 50 executes the requested shift according to existing shift control strategy. The controller 50 can thereafter repeat step S102.

Step S106 is arrived at when the change-of-mind shift is detected at step S104. Step S106 entails determining a desired shift time of the next-requested shift detected at step S104. Such information may be pre-recorded in memory (M) in a lookup table, for instance a two-dimensional data table indexed by target transmission output speed and driver-intended input torque. The method 100 then proceeds to step S108.

At step S108, the controller 50 next calculates the change in turbine speed that is required to attain the next-requested gear state. This step includes determining the difference between speed of the turbine 17 of FIG. 1 at the current or first-requested gear state, which can be reported or measured as is known in the art, and that at the next-requested gear state, i.e., $N_{NR}=(GR_{NR})(N_O)$, with $N_{NR}$ being the speed at the next-requested gear state, which in turn can be calculated by the controller 50 as the product of the required target transmission output speed $(N_O)$ and the gear ratio for the next-requested shift $(GR_{NR})$, both being known or calibrated values from the prediction module 38 of FIG. 1. The method 100 then proceeds to step S110.

Step S110 includes calculating a predicted acceleration profile of the turbine 17 for the next-requested shift using the values from steps S106 and S108, i.e., $$\alpha_{TP} = \frac{\Delta N_T}{t_D},$$

wherein $\alpha_{TP}$ is the acceleration profile of the turbine 17, $\Delta N_T$ is the difference between turbine speed at the first-requested and next-requested states from step S108, and $t_D$ is the desired shift time from step S106. The method 100 proceeds to step S112 or S114, or one of any number of additional or alternative change-of-mind shift maneuver profiles if the controller 50 is so programmed. In the example of FIG. 2, the two programmed change-of-mind shift profiles are a skip-at-sync quick shift-to-quick shift (S-QS2QS) profile, as executed at step S112, and a power downshift-to-power downshift (S-PD2PD) profile as executed at step S114.

At step S112, the controller 50 executes the requested skip-at-sync quick shift-to-quick shift maneuver. Conventionally, torque management in such a maneuver would ramp out and would have to be ramped back in again, which can cause delay and degrade shift performance. The method 100 instead ramps the torque management to a calculated value for the next-requested shift a calibrated time ahead before synchronization of the ongoing and offgoing clutches for the first-requested shift.

In particular, the controller 50 may use the following powertrain lumped inertia equation to facilitate the QS2QS maneuver:

$T_M = K1 \cdot \alpha_{TP} + K2 \cdot T_{O,DES} + K3 \cdot \alpha_{O,DES} - T_{CL}$ where $T_M$ is the input torque in the form of a calculated managed torque from the engine 12, K1, K2, K3 are calibration values, e.g., modeled for the particular transmission 14, $\alpha_{TP}$ is the predicted turbine acceleration for the next-requested gear, $T_{O,DES}$ is the desired output torque for the next-requested gear, i.e., a calibrated value that is a function of input speed, and $\alpha_{O,DES}$ is the desired output acceleration, i.e., calculated as $$(T_{O,DES})\left(\frac{\alpha_T}{T_I}\right),$$

with $\alpha_T$ being the instantaneous acceleration as it exists at the moment of initiation of the next-requested shift. $T_{CL}$ is the losses in the torque converter (TC) shown in FIG. 1, i.e., $(I_E)(\alpha_E)$.

$$\alpha_{TP} = \frac{N_{GR2} - N_{GR1}}{t_{D2}},$$

where $N_{GR2}$ and $N_{GR1}$ are the known gear ratios for the next-requested and first-requested shifts, respectively and $t_{D2}$ is the desired shift time for completing the next-requested shift, all of which are calibrated values. As is known in the art, one may acquire $N_{GR2}$ or $N_{GR1}$ by multiplying the gear ratio by the output speed.

Referring to FIG. 3, traces 40 depict the example QS2QS maneuver as controlled via the controller 50 using the prediction module 70 of FIG. 1, with time (t) depicted on the horizontal axis and signal amplitude (A) depicted on the vertical axis. A first-requested shift commences at about $t_1$ with, e.g., a quick tap shift of the shift device 33 of FIG. 1 or another request from a present gear, e.g., $7^{th}$, to a first-requested gear, e.g., $6^{th}$ gear. A pressure command to the primary oncoming clutch (trace $P_{ONP}$) rises to a calibrated level while a primary offgoing clutch pressure command (trace $P_{OFP}$) quickly decreases. Just before turbine speed (trace $N_T$) ramps up, the level of managed torque $(T_M)$ drops, and then quickly rises and plateaus as the offgoing clutch pressure $(P_{OFH})$ for a holding clutch of the transmission 14 for the shift exhausts.

At around $t_2$ a driver requests a change-of-mind shift, e.g., to $5^{th}$ gear, before the first-requested shift has completed. Absent the use of the method 100, a sharp decrease in managed torque $(T_M)$ from the engine 12 would result, as indicated by dotted line trace 42, which may be perceived as a brief lag or unexpected change in engine speed. The method 100 instead functions by ramping beginning at $t_2$ to a calculated torque management level, as indicated by trace 44 between $t_2$ and $t_3$. The value of the managed torque request $(T_M)$ in the area of trace 44 is thus provided by operation of the prediction module 70 as described above.

At step S114 of FIG. 2 the controller 50 executes the example power downshift-to-power downshift (PD2PD) maneuver. In this alternative maneuver, the controller 50 calculates a predicted clutch torque $(T_{CP})$ for the offgoing clutch needed for the next-requested shift. In an embodiment, the predicted clutch torque $(T_{CP})$ may be calculated using a powertrain inertia model as follows:

$$T_{CP} = R_C \left[ T_E - I_E \cdot \alpha_E + (TR-1)\left[\frac{N_E}{K}\right]^2 - (I_{TC} + I_{TI})\alpha_{TP} \right]$$

That is, an engine inertia value $(I_E)$ describes the known inertia of the engine 12 and each attached accessory drive, valve train, fly wheel, flex plate, and the like. Such information may be determined beforehand based on the design of the vehicle 10 and recorded in memory M. The known inertia $(I_{TC})$ of an impeller/pump of the torque converter TC and an inertia value of the turbine 17 $(I_{TI})$ of FIG. 1 are also used. $R_C$ is the known clutch lever ratio, i.e., the torque ratio with respect to the input member. $T_E$, $T_R$, and $\alpha_E$ are the engine torque, torque ratio of the TC, and engine acceleration, respectively. K is a calibration value representative of characteristics of the torque converter (TC) of FIG. 1. $\alpha_{TP}$ is the predicted turbine acceleration described above.

Figure 4:
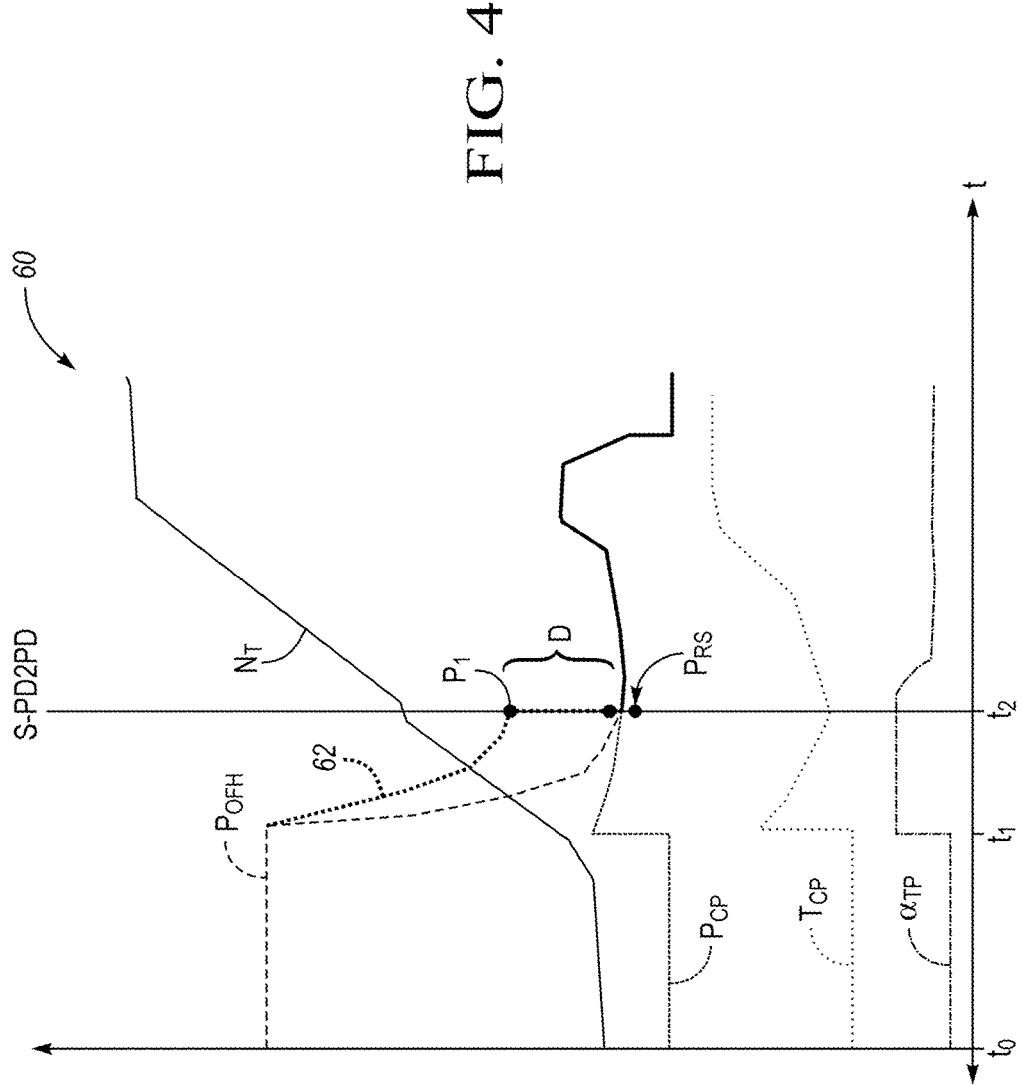
FIG. 4 is a flow chart describing example control logic for controlling an example skip-at-sync power downshift-to-power downshift maneuver.

Referring to FIG. 4, traces 60 show that the calculated value $T_{CP}$ allows the controller 50 to stage the offgoing holding clutch pressure ($P_{OFH}$) for the S-PD2PD shift maneuver at a predicted target clutch pressure ($P_{CP}$) level above but near that of the return spring pressure ($P_{RS}$) for the clutch so as to reduce its slip time, and minimize perceived delay in the next-requested shift. The target clutch pressure ($P_{CP}$) may be calculated as a function of the predicted clutch torque ($T_{CP}$) that is calculated, as set forth above, using the predicted profile acceleration ($\alpha_{TP}$), e.g., with the relationship between torque and pressure being predetermined and captured in a lookup table.

Trace 62 indicates the normal trajectory of offgoing holding clutch pressure after a power downshift, wherein the clutch pressure is set to a calibrated fixed level $P_1$ that is at an arbitrary level set well above return spring pressure ($P_{RS}$) so as to adequately prepare for a subsequent upshift or downshift. The difference (D) between the calibrated fixed level $P_1$ and the return spring pressure $P_{RS}$ roughly represents the volume of fluid in the clutch that would have to be evacuated prior to the next-requested downshift absent the present approach, with a corresponding time delay eliminated by the present approach.

Step S116 includes executing a shift control action of the transmission 14 using the shift control value determined at step S112 or S114, with the particular value depending on the shift type identified at step S104. The method 100 is therefore complete with the execution of the particular change-of-mind shift. Using the above-described method 100, therefore, control parameters are predicted for a next-requested shift to enhance the overall quality of the shift. For the described skip-at-sync quick shift-to-quick shift maneuver, the method 100 may help improve performance by reducing harsh ramping out/in of torque management, which can prolong the shift and cause shift noise due an unexpected change in engine speed. For the skip-at-sync power downshift-to-power downshift maneuver, the approach helps avoid the calibration-intensive methods of the prior art in favor of physics-based inertia modeling to determine the required control pressures. The approach also results in increased performance by reducing the overall duration of the maneuver, accomplished via reducing the slip time(s) of the subsequent shift(s).

While the best modes for carrying out the present disclosure have been described in detail, those familiar with the art to which this disclosure pertains will recognize various alternative designs and embodiments may exist that fall within the scope of the appended claims.

The invention claimed is:

1. A powertrain comprising:
a torque converter having a turbine;
a transmission having a plurality of friction clutches and an input member connected to the turbine; and
a controller having a processor and memory on which is recorded instructions for controlling a change-of-mind shift maneuver of the transmission from a first-requested shift to a next-requested shift, wherein the controller is configured to detect the change-of-mind shift maneuver, predict an acceleration profile of the turbine for the next-requested shift as a function of a calibrated desired shift time for the change-of-mind shift maneuver and an output speed of the transmission, calculate a shift control value for the next-requested shift using the predicted acceleration profile, and command execution of the next-requested shift using the calculated shift control value.

2. The system of claim 1, wherein the controller is programmed to receive powertrain parameters and detect the change-of-mind shift maneuver using the received powertrain parameters, including receiving a throttle level, a braking level, and a shift request.

3. The system of claim 1, wherein the change-of-mind shift maneuver is a power downshift-to-power downshift maneuver of the transmission and the shift control value is a calculated clutch pressure for an offgoing holding clutch for the first-requested shift, and wherein the controller automatically commands the calculated clutch pressure for the offgoing holding clutch before executing the next-requested shift.

4. The system of claim 3, wherein the powertrain includes an engine that is fluidly connected to the transmission via torque converter having the turbine, and wherein the controller uses an inertia model of the powertrain to calculate the shift control value for the power downshift-to-power downshift maneuver.

5. The system of claim 1, wherein the change-of-mind shift maneuver is a skip-at-sync quick shift-to-quick shift maneuver of the transmission, and wherein the shift control value is a level of requested torque management from an engine.

6. The system of claim 5, wherein the controller is programmed to ramp the level of requested torque management for the next-requested shift a calibrated amount of time ahead of synchronization of an offgoing and an oncoming clutch for the first-requested shift.

7. The system of claim 1, wherein the memory includes a lookup table of the desired shift time, and wherein the lookup table is indexed by driver torque request and speed of the turbine.

8. A method for controlling a change-of-mind shift maneuver of powertrain that includes a torque converter having a turbine, a transmission having a plurality of friction clutches and an input member connected to the turbine, and a controller, wherein the change-of-mind shift maneuver includes a first-requested shift and a next-requested shift, the method comprising:
receiving, via the controller, a set of powertrain parameters;
detecting the change-of-mind shift maneuver via the controller using the set of powertrain parameters;
predicting an acceleration profile of the turbine for the next-requested shift as a function of a calibrated desired shift time and an output speed of the transmission;
calculating a shift control value for the next-requested shift using the predicted acceleration profile; and
commanding the calculated shift control value, via the controller, to thereby complete the next-requested shift.

9. The method of claim 8, wherein receiving a set of powertrain parameters includes receiving each of a throttle level, a braking level, and a shift request.

10. The method of claim 8, wherein the change-of-mind shift maneuver is a skip-at-sync power downshift-to-power downshift maneuver and calculating the shift control value includes calculating a clutch pressure for an offgoing holding clutch of the transmission, and then commanding, via the controller, the clutch pressure for the offgoing holding clutch before executing the next-requested shift.

11. The method of claim 10, wherein the powertrain includes an engine which is fluidly connected to the transmission via a torque converter having the turbine, and wherein calculating a shift control value includes using an inertia model of the powertrain.

12. The method of claim 10, wherein the change-of-mind shift maneuver is a skip-at-sync quick shift-to-quick shift maneuver, and wherein calculating a shift control value includes calculating a level of requested torque management from the engine.

13. The method of claim 12, further comprising: ramping the level of requested torque management for the next-requested shift a calibrated amount of time ahead of synchronization of an offgoing and an oncoming clutch for the first-requested shift.

14. The method of claim 8, wherein predicting an acceleration profile of the turbine for a next-requested shift of the detected shift maneuver as a function of a calibrated desired shift time and an output speed of the transmission includes extracting the desired shift time from a data table indexed by target output speed and driver intended torque.

* * * * *